United States Patent [19]

Steijger et al.

[11] Patent Number: 4,848,171

[45] Date of Patent: * Jul. 18, 1989

[54] ROCKER ARM DRIVE FOR ELECTRICAL APPLIANCES

[75] Inventors: Wilfridus Steijger; Michael Odemer, both of Frankfurt; Otto Schweingruber, Glashütten; Jochen Cimbal, Friedberg, all of Fed. Rep. of Germany

[73] Assignee: Braun Aktiengesellschaft, Kronberg, Fed. Rep. of Germany

[ * ] Notice: The portion of the term of this patent subsequent to Mar. 17, 2004 has been disclaimed.

[21] Appl. No.: 119,204

[22] Filed: Nov. 5, 1987

Related U.S. Application Data

[63] Continuation of Ser. No. 680,637, Dec. 12, 1984, abandoned.

[30] Foreign Application Priority Data

Sep. 27, 1984 [DE] Fed. Rep. of Germany ....... 3346567

[51] Int. Cl.$^4$ .............................................. F16H 21/18
[52] U.S. Cl. ........................................ 74/42; 74/40; 74/519; 74/581
[58] Field of Search .................... 74/40, 42, 519, 581

[56] References Cited

U.S. PATENT DOCUMENTS

| 301,115 | 7/1884 | Gowdy | 74/42 |
| 3,357,266 | 12/1967 | Techtmann et al. | 74/42 |
| 4,019,252 | 4/1977 | Port et al. | 30/43.92 |
| 4,367,658 | 1/1983 | Rochelt | 74/40 |
| 4,649,762 | 3/1987 | Messinger et al. | 74/42 |
| 4,669,322 | 6/1987 | Messinger et al. | 74/42 |

FOREIGN PATENT DOCUMENTS

| 2117319 | 10/1972 | Fed. Rep. of Germany | 74/581 |
| 2409592 | 2/1974 | Fed. Rep. of Germany | . |
| 2616391 | 12/1976 | Fed. Rep. of Germany | 74/519 |
| 2631751 | 2/1977 | Fed. Rep. of Germany | 74/581 |
| 2603207 | 8/1977 | Fed. Rep. of Germany | 74/519 |
| 2910469 | 3/1979 | Fed. Rep. of Germany | . |
| 624331 | 6/1949 | United Kingdom | 74/519 |

Primary Examiner—Allan D. Herrmann

[57] ABSTRACT

Device for converting the rotary motion of an eccentric driven by a motor shaft into an oscillating motion of a working tool in electrically powered appliances, consisting of a double-armed rocker arm and a connecting rod connecting the rocker arm with the eccentric, as well as a single articulation at whose articulation midpoint all the motion axes of the connecting rod and rocker arm meet directly or indirectly.

9 Claims, 3 Drawing Sheets

ROCKER ARM DRIVE FOR ELECTRICAL APPLIANCES

BACKGROUND OF THE INVENTION

This application is a continuation of application Ser. No. 680,637, filed 12/12/84.

The invention relates to a device for converting the rotary motion of an eccentric driven by a motor shaft into a reciprocating motion of a working tool coupled with a shaft pin in electrically powered appliances, in whose housing a double-armed rocker arm equipped with a shaft pin is pivotably mounted, and a connecting arm linking the double-armed rocker arm with the eccentric is provided whereby the double-armed rocker arm and the connecting arm are coupled together by an articulation, whose articulation midpoint lies on the lengthwise axis of the corresponding lever arm.

German Pat. No. 24 09 592 teaches a dry shaver with a rotary motor, an oscillating lower cutter, and a crank and rocker linkage to convert the rotary motion of the motor into the oscillating motion of the lower cutter, whereby the motor shaft is aligned parallel to the lengthwise axis of the rocker arm engaging the lower cutter and is laterally displaced by the length of the crank rod. The crank rod is connected both by an elastic gimbal suspension to the eccentric on the motor shaft and by a ball joint with the rocker arm motion. This type of motion transmission means of two differently designed and spatially separated articulation is very expensive and extremely problematical from the engineering standpoint because of the tolerances to be maintained in the bearings and articulated parts. The useful power destroyed by the motion transmission device is very high. The oscillating behavior of the rocker arm, in which a constant amplitude is deemed optimum in a predetermined rpm range of the motor, is highly negative.

Jappanese Patent Y2 57-57650 teaches a dry shaver with rotary motor, an oscillating lower cutter, and a crank and rocker linkage to convert the rotary motion of the motor into an oscillating motion of the lower cutter. The motor shaft is aligned parallel with the lengthwise axis of the rocker arm engaging the lower cutter and is disposed laterally offset by the length of the crank rod. The crank rod is made fork-shaped in the vicinity of the rocker arm, whereby the rocker arm engages this fork and is held pivotably by means of an articulation pin in the fork. The crank rod is also connected by an eccentric drive provided in the connecting rod head with the motor shaft of the rotary motor. An important disadvantage of this type of motion transmission is that the swing height of the rocker arm can only be compensated by the crank rod taking into account considerable pressure stresses and high frictional forces at the two bearing points, the articulation pin and the eccentric drive, of the crank rod, whereby a high percentage of the power to be transmitted is destroyed, and must necessarily be made up by increasing the amount of energy supplied. Increased energy consumption makes itself perceptively disadvantageous to the user of such a device by virtue of the fact that he must recharge or replace the batteries after a short period of use, for example after a small number of shaves.

SUMMARY OF THE INVENTION

The goal of the present invention is to provide a device of the species recited hereinabove, wherein conversion of the rotary motion into a reciprocating motion is accomplished with the smallest possible losses in driving energy. The device is intended to ensure unimpeded motion in all required degrees of freedom with low friction and little noise.

According to the invention this goal is achieved by virtue of the fact that all motion axis of the double-armed rocker arm and the connecting arm meet directly or indirectly at the articulation midpoint.

According to the invention, the midpoint of the articulation coincides with the point of intersection of the lengthwise axis of the corresponding lever arm of the double-armed rocker arm and the connecting arm.

The solution according to the invention is characterized in particular by low power consumption and an improved amplitude behavior over rpm variations, due to the fact that only one articulation is used to convert the motion, the midpoint of which articulation combines all degrees of freedom. This articulation with its articulation midpoint lying on the lengthwise axis of the corresponding lever arm of the double-armed rocker arm, at which all the motion axes of components executing a swiveling motion meet, makes it possible, as a result of the power introduced at this articulation midpoint, among other things to reduce the stability of the double-armed rocker arm and connecting arm, resulting in a decrease in the total mass of these components. In addition, the diameter of the bearing of the double-armed rocker arm as well as of the bearing pin which engages the connecting arm can be reduced, resulting in reduced friction at these bearing points. A number of different embodiments is possible within the framework of the present invention, each of which confers additional advantages.

An especially simple and economically manufacturable embodiment of the invention is characterized by the fact that a bearing pin is provided on the lever arm, associated with the connecting arm, of the double-armed rocker arm, said pin extending along the lengthwise axis of said rocker arm, by the fact that the rigidly designed connecting arm comprises at one end a bearing bore with a relatively thin wall thickness, which surrounds the bearing pin with a predetermined amount of play, by the fact that the bearing pin is provided with a stop, against which the connecting arm abuts, by the fact that the stop as well as the area around the bearing bore are so shaped that unimpeded rolling in the contact area in all directions of motion of the connecting arm and double-armed rocker arm is ensured.

The articulation described with reference to the above features ensures direct coincidence of the motion axes of the connecting arm and the double-armed rocker arm at the midpoint of the articulation which lies on the lengthwise axis of the rocker arm.

Another embodiment is characterized by the fact that the connecting arm is rotatably mounted on the double-armed rocker arm, and is rotatable about lengthwise axis of the corresponding lever arm of said rocker arm by a bearing pin and by the fact that the connecting arm comprises an articulation pair/film hinge pair, whose middle/bending axis intersects the lengthwise axis of the corresponding lever arm of the double-armed rocker arm. In this embodiment, the locally defined middle/bending axis of the connecting arm, which runs through the midpoint of the articulation, ensures that the motion axes of the connecting arm are directed indirectly to the midpoint of the articulation.

In another design of the latter embodiment, provision is made for the connecting arm to have a fork-shaped end, for the fork tines of the connecting arm to be connected together by a stud, for an arm with a bearing bore extending in the direction of the fork opening to be provided on the stud.

Another advantage of the invention consists in the fact that it allows designs which especially relate to adaptation of this device to predetermined installation criteria in appliances of the stated species, without additional structural expense. For this purpose, the lengthwise axis of the lever arm of the double-armed rocker arm which is associated with the connecting arm runs at an angle to the lengthwise axis and intersects lengthwise axis Z of the connecting arm at right angles.

In addition, the motion conversion shown according to the invention is not limited to a certain lever ratio of the two lever arms of the double-armed lever. The latter can be varied according to the specific application.

Further features, advantages, and details of the invention will be apparent from the following specification and the drawing in which preferred embodiments of devices for motion conversion, for example for installation in a dry shaver, are shown:

DETAILED DESCRIPTION

Figure 1:
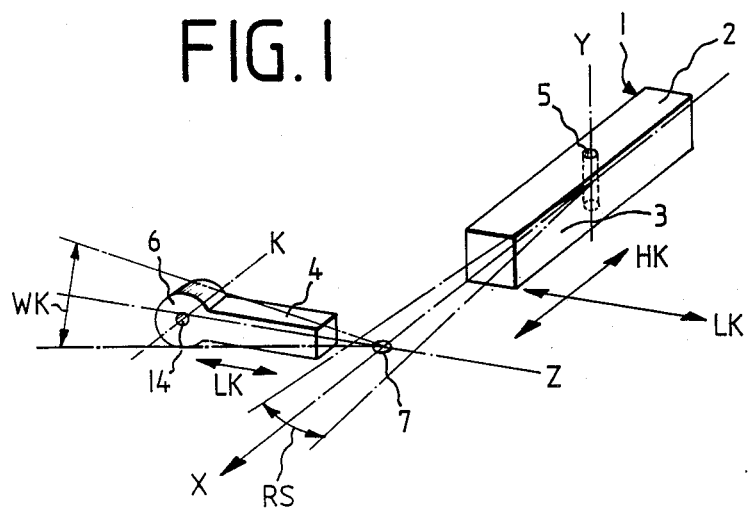
FIG. 1 is a schematic representation of a double-armed rocker arm and connecting arm as well as their motion axes.

FIG. 1 shows the double-armed rocker arm at 1, the lever arm provided with a shaft pin for the working tool to be driven, e.g. the cutter block of a dry shaver, at 2 and the lever arm associated with connecting arm 4 at 3. The double-armed rocker arm comprises a bearing bore 5, whose pivot axis is designated y. The bearing bore is engaged by a shaft pin, not shown, located on a housing of the appliance. The pivot point of the lengthwise axis x running through lever arms 2 and 3 lies on pivot axis y.

At the bottom dead center of radial pivoting motion RS of double-armed rocker arm 1 about pivot axis y, the lengthwise axis z of connecting arm 4 intersects lengthwise axis x at right angles. Articulation midpoint 7 is located at the intersection of the two lengthwise axes x and z. Crank arm 4 is provided with a connecting rod or crank head 6, in whose bore 14 with central axis K an eccentric pin for driving purposes, not shown, engages. The circular motion of central axis K of crank head 6 is converted by crank head 6 and connecting arm 4 mounted at articulation midpoint 7 into an angular component WK and a linear component LK. Linear component LK causes a radial pivoting motion RS of double-armed rocker arm 1 with its lengthwise axis x, with a linear component LK and a linear height component HK.

The above-mentioned motion components, hereinafter referred to generally as motion axes, are deliberately brought together, at an articulation midpoint 7 located on lengthwise axis x of the double-armed rocker arm and articulated by means of a single articulation which combines all the degrees of freedom.

Figure 2:
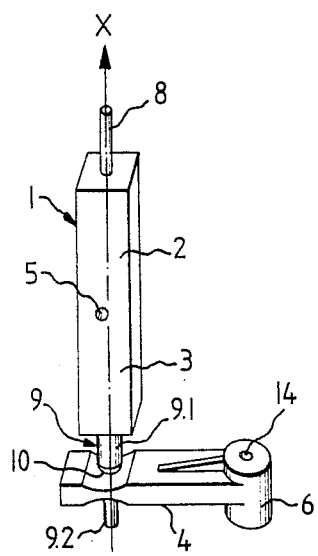
FIG. 2 is a perspective view of a double-armed rocker arm, with a rigid connecting arm coupled thereto.

FIG. 2 shows an articulation combining all the degrees of freedom between double-armed rocker arm 1 and connecting arm 4 at whose articulation midpoint all the motion axes are directly combined.

On double-armed rocker arm 1, consisting of lever arms 2 and 3 and bearing bore 5, a shaft pin 8 is provided on lever arm 2 for coupling a working tool and a staggered bearing pin 9 is provided on lever arm 3. Lengthwise axis x of double-armed rocker arm 1 runs both through shaft pin 8 and through bearing pin 9. The step provided on the bearing pin divides the latter into a pin part 9.1 with a larger diameter and a pin part 9.2 with a smaller diameter, whereby the transition between the two parts of the pin is termed stop 10. Rigidly designed connecting arm 4 abuts stop 10, which has a rounded shape. Bearing pin 9.2 is guided through a bearing bore 11 (FIG. 3) provided in connecting arm 4. Pin parts 9.1 and 9.2 of bearing pin 9 can be formed directly on lever arm 3. Pin part 9.2 however can consist of a metal pin inserted in pin part 9.1.

A crank head 6 with bore 14 to accept an eccentric pin is provided on connecting arm 4 at the end opposite bearing bore 11.

Figure 3:
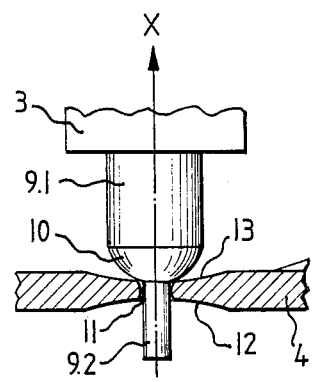
FIG. 3 is an articulation according to FIG. 2 with a lengthwise section through the connecting arm.
Figure 4:
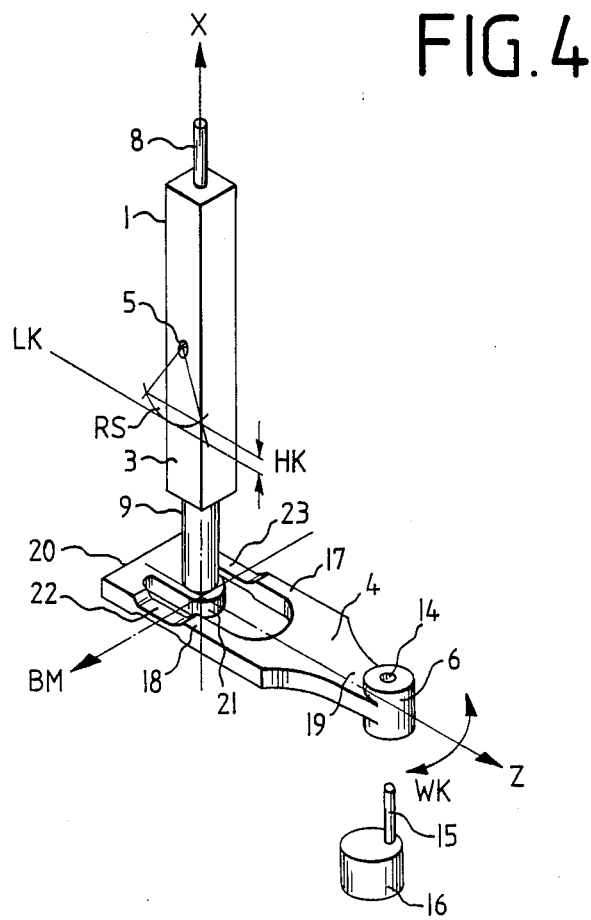
FIG. 4 is a perspective view of a double-armed rocker arm and a fork-shaped connecting arm with film hinges.

FIG. 3 shows details of the articulation shown in FIG. 2 with a partial section through connecting arm 4. In the vicinity of the articulation, the wall thickness of connecting arm 4 is sharply reduced. This is achieved, for example by two groove or trough-shaped depressions 12 and 13 opposite one another, through whose deepest points lengthwise axis x of the double-armed rocker arm passes. The central axis of bearing bore 11 lies on lengthwise axis x. The spherically rounded stop 10, during the pivoting motion of lever arm 3 with its lengthwise axis x and the pivoting motion of connecting arm 4, rolls over a partial area around pivot axis x within trough-shaped depression 13 at its wall. Trough-shaped depression 13 is shaped such that it allows unimpeded rolling or unimpeded motion of these articulated parts. This also applies to the play between the wall of bearing bore 11 and pin part 9.2, which must be sufficiently large for the pivoting motion of bearing pin 9.2 with lengthwise axis x, at the given wall thickness of connecting arm 4 in the vicinity of bearing bore 11, to take place unimpeded within bearing bore 11. FIG. 4 shows a double-armed connecting arm 1 pivotable about bearing bore 5, whose lengthwise axis x passes centrally through shaft pin 8, bearing bore 5, and bearing pin 9.

Crank arm 4 is made fork-shaped. Fork tines 17 and 18 are brought together both to a fork handle 19, at whose end crank head 6 is formed, and are also connected to one another by a stud 20. An arm 21 extending into the fork opening is formed on stud 20. Fork tines 17 and 18 are each provided with a film hinge 22 and 23, whose common middle/bending axis BM intersects lengthwise axis x. Film hinges 22, 23 are so designed that the flexible tines, during the radial pivoting motion RS of lever arm 3, ensure an S-shaped bent form to compensate for the height component HK of lever arm 3.

Crank arm 4 is connected both by bore 14 in crank head 6 with eccentric pin 15 of eccentric 16 and also by a bearing bore provided in the arm to articulate pivotably about angular component WK on bearing pin 9.

Figure 5:
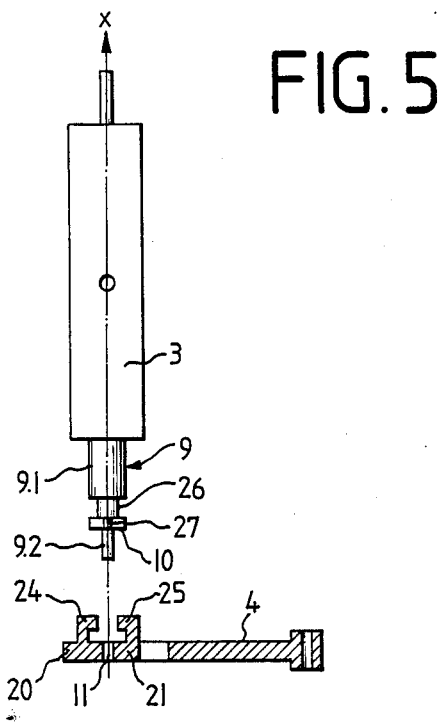
FIG. 5 is a double-armed rocker arm and a fork-shaped connecting arm with fastening means in section.

Further details of the articulation of connecting arm 4 and lever arm 3 are shown in FIG. 5. Bearing pin 9 provided on lever arm 3 consists of the two pin parts 9.1 and 9.2. The stop 10 formed in the transition area between the two pin parts by their different diameters is likewise made flat, like the area of arm 21 formed on stud 20 of connecting arm 4 which surrounds bearing bore 11. In the assembled state, bearing bore 11 surrounds pin part 9.2 with a small amount of play, whereby arm 21 abuts stop 10. The articulation midpoint of this articulation lies on lengthwise axis x running through bearing bore 11, within bearing bore 11. At this articulation midpoint, all motion axes of double-armed rocker arm 1 and connecting arm 4 come together both directly and indirectly.

The fastening means, in the form of two hooks 24 and 25 formed on arm 21, engage a circumferential groove 26, provided on pin part 9.1, and serve to facilitate assembly of double-armed rocker arm 1 and connecting arm 4. To guide hooks 24 and 25 into groove 26, pin part 9.1 has two grooves 27 running parallel to lengthwise axis x, one of which is visible in FIG. 5. Hooks 24 and 25 are so designed that they do not contact any part of pin part 9.1 when arm 21 abuts stop 10.

Figure 6:
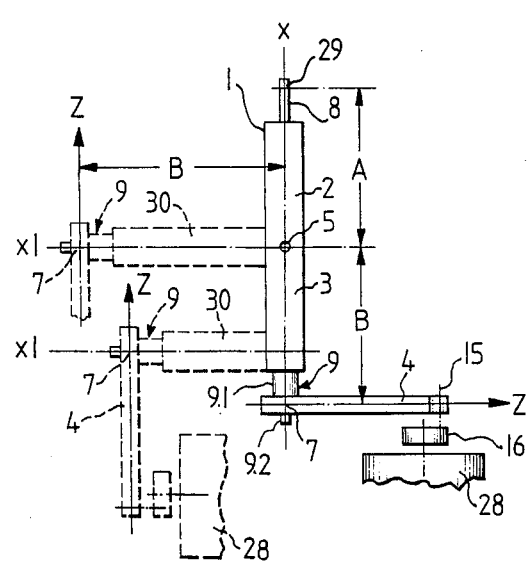
FIG. 6 is a schematic representation of structural variations of the double-armed rocker arm.

The articulated connection between connecting arm 4 and double-armed rocker arm 1 allows a plurality of structural variations in double-armed rocker arm 1. Several of them are shown schematically in FIG. 6, whereby the basic version described in the previous figures is shown by continous lines and two variations are shown by dashed lines.

The basic version consists of double-armed rocker arm 1 with the two lever arms 2 and 3, shaft pin 8, bearing pin 9 and pin parts 9.1 and 9.2, connecting arm 4, eccentric pin 15, eccentric 16, and rotary motor 28. The length A of lever arm 2 extends from the center of bearing bore 5 to a coupling point 29 of a working tool, not shown, which engages the shaft pin and the length B of lever arm 3 extends from the center of bearing bore 5 up to articulation midpoint 7. Coupling point 29, the midpoint of bearing bore 5, and the articulation midpoint lie on the lengthwise axis x of the double-armed rocker arm. The lever ratio A:B of lever arms 2 and 3 can be A=B or can be different, i.e. A is less than B or A is greater than B, depending on the individual application.

It is also possible to bend lever arm 3 associated with connecting arm 4 at an angle. In these cases, it is merely necessary to ensure that the lengthwise axis of bent lever arm 3, designated $x_1$ in FIG. 6, intersects lengthwise axis x either at the midpoint of bearing bore 5 or in lever arm 3 and that lengthwise axis z of connecting arm 4 intersects lengthwise axis $x_1$ of bent lever arm 30 at right angles.

While embodiments and applications of the invention have been shown and described, it will apparent to those skilled in the art that many more modifications are possible without departing from the inventive concepts herein described.

We claim:
1. A device for converting rotary motion of an eccentric driven by a shaft into reciprocating motion of a working tool in a powered appliance having a housing and arm support means in said housing comprising:
   rocker arm structure having a first lever arm portion with a free end for coupling to the working tool of the powered appliance, a second lever arm portion having a free end and a lengthwise axis, bearing pin structure at the free end of said second lever arm portion having an axis coaxial with the lengthwise axis of said second lever arm portion, and bearing means having a pivot axis located between said first and second lever arm portions for engagement with said arm support means; and
   a connecting arm having a first end and a second end, said connecting arm including crank head means at said second end of said connecting arm that includes first bearing bore structure for providing direct coupling to the eccentric, and
   second bearing bore structure at said first end of said connecting arm in which said bearing pin structure is disposed, said bearing pin structure and said second bearing bore structure interacting with one another to convert angular oscillatory motion of said connecting arm as driven by the eccentric to rocking motion of said rocker arm structure about said pivot axis to reciprocate the working tool.

2. A device for converting rotary motion of an eccentric driven by a shaft into reciprocating motion of a working tool in a powered appliance having a housing and arm support means that defines a pivot axis, comprising:
   a double-armed rocker arm (1) including a first lever arm portion (2) having a free end, a second lever arm portion (3) having a free end, said second lever arm portion having a lengthwise axis (x), and bearing means (5) providing a pivot axis transverse to said lengthwise axis (x) and located between said first lever arm portion (2) and said second lever arm portion (3) for engagement with the arm support means;
   a drive member (8) extending from the free end of said first lever arm portion (2) for driving the working tool;
   a bearing pin means (9) having an axis coaxial with said lengthwise axis (x) and extending from the free end of said second lever arm portion (3);
   a one piece connecting arm (4) having a first end and a second end and a lengthwise axis (z);
   a crank head means (6) at said second end of said connecting arm (4) and including a first bearing bore (14) to provide direct coupling to the eccentric; and
   a second bearing bore (11) at said first end of said connecting arm (4) in which said bearing pin means (9) is disposed, said bearing pin means (9) and said second bearing bore (11) interacting with one another to convert angular oscillatory motion of said connecting arm (4) as driven by the eccentric to rocking motion of said rocker arm (1) about said pivot axis to reciprocate the working tool, whereby direct coincidence of said lengthwise axis (z) of said connecting arm (4) and said lengthwise axis (x) of said second lever arm portion (3) of said double-armed rocker arm (1) occurs in said second bearing bore (11).

3. The device as in claim 2, wherein the direct coincidence of said motion axis of said connecting arm (4) and said double-armed rocker arm (1) coincides with the intersection of said lengthwise axis of said second lever arm portion (3) and a lengthwise axis of said connecting arm (4).

4. The device as in claim 3, wherein said connecting arm (4) is rotatably mounted to rotate about the lengthwise axis of said second lever arm portion (3), and wherein said connecting arm (4) further includes first and second film hinge means having a common bending axis (BM) which intersects said bearing bore (11).

5. A device for converting rotary motion of an eccentric driven by a shaft into reciprocating motion of a working tool in a powered appliance having a housing and arm support means that defines a pivot axis, comprising:

a double-armed rocker arm (1) including a first lever arm portion (2) having a free end, a second lever arm portion (3) having a free end, said second lever arm portion having a lengthwise axis (x), and bearing means (5) providing a pivot axis transverse to said lengthwise axis (x) and located between said first lever arm portion (2) and said second lever arm portion (3) for engagement with said arm support means;

a drive member (8) extending from the free end of said first lever arm portion (2) for driving the working tool;

bearing pin means (9) extending from the free end of said second lever arm portion (3) along said lengthwise axis (x) of said second lever arm portion (3);

a rigid connecting arm (4) having a first end and a second end and a motion axis (z); said first end being relatively thinner than the rest of said connecting arm (4);

a crank head means (6) at said second end of said connecting arm (4) and including a bearing bore (14) to provide direct coupling to the eccentric; and a single motion-transmitting bearing including a bearing bore (11) at said first end of said connecting arm (4) in which said bearing pin means (9) is disposed to provide direct coupling of said first end of said connecting arm (4) to said bearing pin means (9) of said second lever arm portion (3) of said double-armed rocker arm (1), for converting the rotary motion of the eccentric to reciprocating motion of the working tool, whereby direct coincidence of said motion axis (z) of said connecting arm (4) and said lengthwise axis (x) of said double-armed rocker arm (1) occurs in said motion-transmitting bearing, said bearing pin means (9) being seated in said bearing bore (11), said bearing pin means (9) also including a stop (10) shaped to mate with said bearing bore (11) to provide unimpeded rolling in the contact area in motion directions of said connecting arm (4) and said double-armed rocker arm (1).

6. A device for converting rotary motion of an eccentric driven by a shaft into reciprocating motion of a working tool in a powered appliance having a housing and arm support means that defines a pivot axis, comprising:

a double-armed rocker arm (1) including a first lever arm portion (2) having a free end, a second lever arm portion (3) having a free end, said second lever arm portion having a lengthwise axis (x), and bearing means (5) providing a pivot axis transverse to said lengthwise axis and located between said first lever arm portion (2) and said second lever arm portion (3) for engagement with said arm support means;

a drive member (8) extending from the free end of said first lever arm portion (2) for driving the working tool; and a bearing pin means (9) having an axis coaxial with said lengthwise axis (x) and extending from the free end of said second lever arm portion (3);

a connecting arm (4) having a first end and a second end and a motion axis (z);

a crank head means (6) at said second end of said connecting arm (4) and including a bearing bore (14) to provide direct coupling to the eccentric; and a single motion-transmitting bearing including a bearing bore (11) in said connecting arm (4) in which said bearing pin means (9) is disposed to provide direct coupling of said first end of said connecting arm (4) to said bearing pin means (9) of said second lever arm portion (3) of said double-armed rocker arm (1), for converting the rotary motion of the eccentric to reciprocating motion of the working tool, whereby direct coincidence of said motion axis (z) of said connecting arm (4) and said lengthwise axis (x) of said second lever arm portion (3) of said double-armed rocker arm (1) occurs in said motion-transmitting bearing, said first end of said connecting arm (4) including a first forked tine (17) having a free end, and a second forked tine (18) having a free end, said first forked tine (17) including first film hinge means and said second forked tine (18) including second film hinge means, said connecting arm (4) also including a stud member (20) connecting the free ends of said first (17) and second (18) forked tines, said connecting arm (4) also including an arm member (21) having a free end, extending from said stud member (20) between said first (17) and second (18) forked tines, said bearing bore (11) being at the free end of said arm member (21), and said first and second film hinge means having a common bending axis (BM) which intersects said bearing bore (11).

7. A device for converting rotary motion of an eccentric driven by a shaft into reciprocating motion of a working tool in a powered appliance having a housing and arm support means that defines a pivot axis, comprising:

a double-armed rocker arm (1) including a first lever arm portion (2) having a free end, a second lever arm portion (3) having a free end, said second lever arm portion having a lengthwise axis (x), and bearing means (5) providing a pivot axis transverse to said lengthwise axis and located between said first lever arm portion (2) and said second lever arm portion (3) for engagement with said arm support means;

a drive member (8) extending from the free end of said first lever arm portion (2) for driving the working tool; and a bearing pin means (9) having an axis coaxial with said lengthwise axis (x) and extending from the free end of said second lever arm portion (3); said bearing pin means (9) including a circumferential groove (26), and guiding groove means (27) running parallel to the lengthwise axis of said second lever arm portion (3)

a connecting arm (4) having a first end and a second end and a motion axis (z); said first end of said connecting arm (4) including a first forked tine (17) having a free end and first film hinge means and a second forked tine (18) having a free end and second film hinge means, said connecting arm (4) also including a stud member (20) connecting the free ends of said first (17) and second (18) forked tines, said connecting arm (4) also including an arm member (21) having a free end, extending from said stud member (20) between said first (17) and second (18) forked tines;

a crank head means (6) at said second end of said connecting arm (4) and including a bearing bore (14) to provide direct coupling to the eccentric; and a single motion-transmitting bearing including a bearing bore (11) in said arm member (21) in which said bearing pin means (9) is disposed to provide direct coupling of said first end of said connecting arm (4) to said bearing pin means (9) of said second lever arm portion (3) of said double-armed rocker arm (1), for converting the rotary motion of the eccentric to reciprocating motion of the working tool, direct coincidence of said motion axis (z) of said connecting arm (4) and said lengthwise axis (x) of said second lever arm portion (3) of said double-armed rocker arm (1) occurring in said motion-transmitting bearing, and said first and second film hinge means having a common bending axis (BM) which intersects said bearing bore (11).

8. The device as in claim 7, further including hook shaped fastening means (24,25) formed on said connecting arm (4).

9. The device as in claim 8 wherein the lengthwise axis of said second lever arm portion (3) runs at an angle to the lengthwise axis of said first lever arm portion (2) and intersects the lengthwise axis of said connecting arm (4) at a right angle.

* * * * *

UNITED STATES PATENT AND TRADEMARK OFFICE
CERTIFICATE OF CORRECTION

PATENT NO. : 4,848,171

DATED : July 18, 1989

INVENTOR(S) : Wilfridus Steijger, et al.

It is certified that error appears in the above-identified patent and that said Letters Patent is hereby corrected as shown below:

On the title page:
Item [30] Foreign Application Priority Data should read as follows:
"December 23, 1983 [DE] Fed. Rep. of Germany . . . . . . 3346657"

Item [56] References Cited should include:
"4,065,977  1/1987  Buzzi"

Col. 1, line 29, insert "by" after --transmission--

Col. 1, line 39, "Jappanese" should be --Japanese--.

Signed and Sealed this

Thirtieth Day of October, 1990

*Attest:*

HARRY F. MANBECK, JR.

*Attesting Officer*     *Commissioner of Patents and Trademarks*